Jan. 29, 1952     I. B. HUMPHREYS     2,584,020
FISHING ROD AND REEL
Filed April 29, 1946     2 SHEETS—SHEET 1
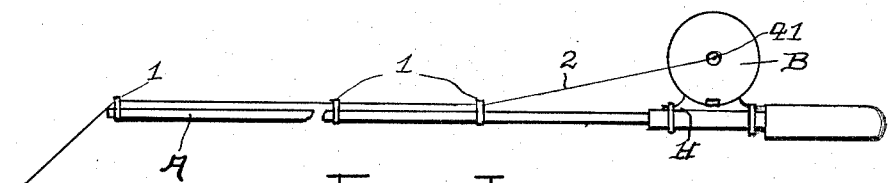
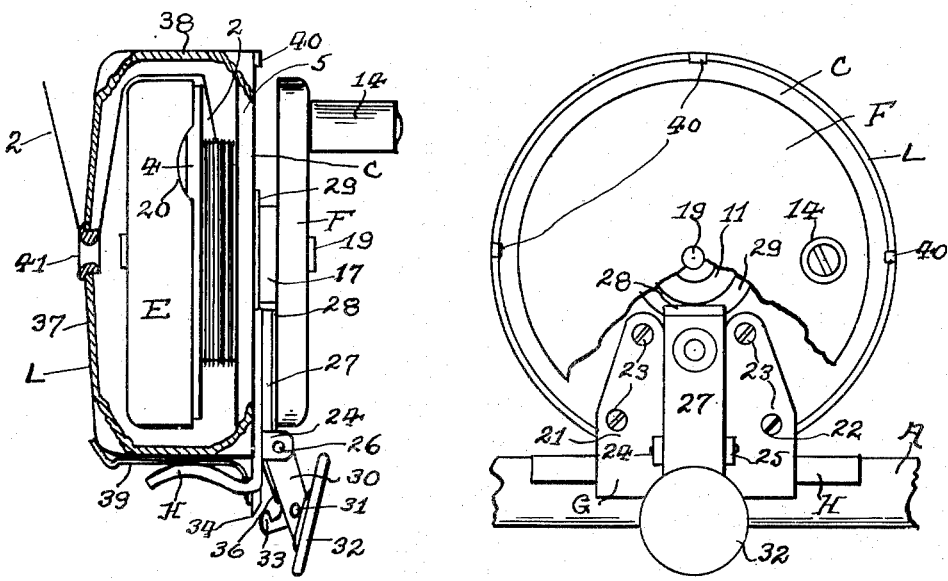
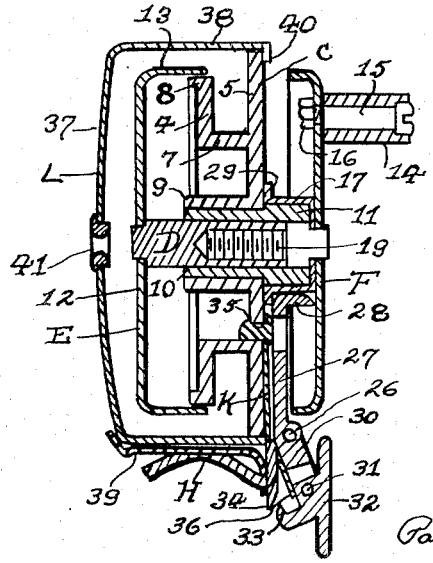
INVENTOR
I. B. HUMPHREYS
ATTORNEYS Jan. 29, 1952  I. B. HUMPHREYS  2,584,020
FISHING ROD AND REEL
Filed April 29, 1946  2 SHEETS—SHEET 2
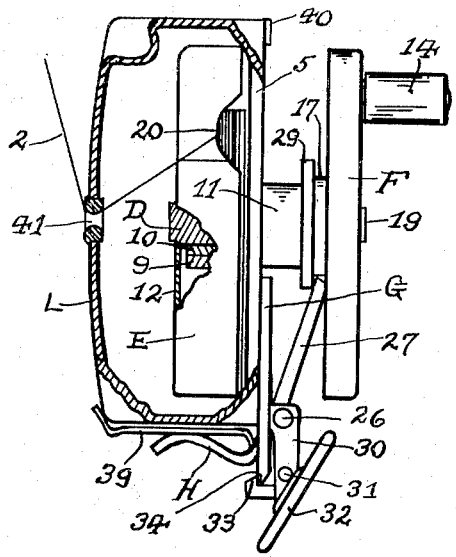
FIG V
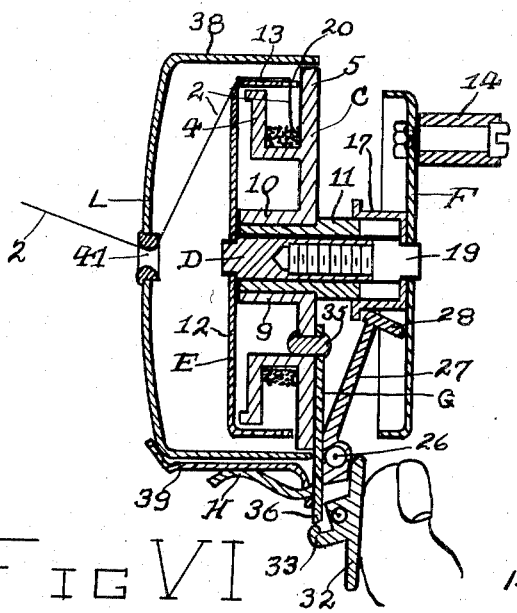
FIG VI
INVENTOR
I. B. HUMPHREYS
ATTORNEYS
Pattison, Wright & Pattison Patented Jan. 29, 1952

2,584,020

UNITED STATES PATENT OFFICE 2,584,020

FISHING ROD AND REEL

Ira B. Humphreys, Denver, Colo., assignor to The Humphreys Investment Company, Denver, Colo., a corporation of Colorado Application April 29, 1946, Serial No. 665,791

15 Claims. (Cl. 43—20)

This invention pertains and is directed to an improved fishing reel for use with a fishing rod as a casting or flyrod reel and more particularly and specifically to a reel of that type where the reel spool or drum remains stationary at all times and the fishing line during the casting operation is drawn off over the end of the spool or drum. Reels of the general type of the present reel are frequently referred to as "spinning" reels.

To those skilled in the art of fishing it will be understood that the advantages of a reel having a stationary spool or drum include avoiding overrunning of the reel during a casting operation and the avoidance of "back lashing" together with the very desirable attribute of being able to make a longer and more accurate cast by reason of the fact that the fishing line feeds or is drawn off from the reel in a manner where friction on or against the line is negligible.

Fishing reels of the stationary spool or drum type are known but the present invention is directed to a reel of this type which is an improvement over known reels and the exact and specific improvements embodied in the present invention will appear from the following description when read in the light of the accompanying drawings.

The primary object of the invention is the provision of a fishing reel of the stationary spool or drum type wherein during both the casting and re-winding operations the axis of the reel spool is at right angles to the axis of the fishing rod.

Another object of the invention is the provision of a fishing reel of the type referred to having novel and improved means for picking up the fishing line during the winding or re-reeling operation.

Another and further object of the invention is the provision of a novel, improved and extremely simple means for braking the fishing line during the casting operation.

A still further object of the invention is the provision of a fishing reel of the type described which is constructed of a comparatively few number of parts and is therefore simple and comparatively cheap of construction.

A still further object of the invention is the provision of a fishing reel which is extremely sturdy and efficient and in which maintenance of the reel in proper operative condition is so negligible as to be substantially nil.

Other objects, novel features of construction and improved results obtainable from the use of the reel in combination with a fishing rod will in part appear from the following description when read in the light of the accompanying drawings and can be learned and observed through the use of the reel.

In the drawings:

Fig. 1 is a side elevational view of a fishing rod having the present improved reel affixed thereto.

Fig. 2 is an end view of the reel of that end to which the winding handle plate is attached.

Fig. 3 is a side view of the reel with the parts in position for casting, the reel housing being broken away and illustrated in vertical section.

Fig. 4 is a view similar to Fig. 3 the parts being shown in vertical section.

Fig. 5 is a side view of the reel with the parts shown in the reeling or line pick-up position, the reel housing being broken away and shown in vertical section.

Fig. 6 is a vertical sectional view through the reel showing the position of the parts when braking action is imparted to the fishing line.

Describing the invention in detail and having reference to the accompanying drawings, A is a conventional fish pole having thereon the usual guide eyes or rings 1 through which the fishing line 2 is threaded and the fishing reel is designated as an entirety at B.

Having reference specifically to the reel C is the spool or drum thereof and comprises a front side 4 and a rear side 5 which are circular plates arranged in spaced parallel relationship and joined by a bottom 7. The rear wall or plate is of slightly greater diameter than the front wall and the upper peripheral edge of the front wall is provided with a horizontally disposed flange or lip 8. The spool or drum has a hub 9 within which is non-rotatably carried a shaft bushing 10 which has an end 11 extending outwardly beyond the front plate 5 of the reel for a considerable distance.

A shaft D is freely rotatably disposed within the bushing and carries at its inner end for rotation with the shaft a winding or pick-up plate E which is a pan-like member having a solid front wall 12 and an inturned horizontally disposed circumferential flange 13. The diameter of this plate is such that its flange 13 closely parallels and rotates about the lip or flange 3 of the inner wall 4 of the spool.

A circular disc-like handle plate F carries at its outer side a winding handle 14 which is freely rotatable upon a screw stud 15 which is secured to the plate in suitable manner as for instance by a nut 16 at the inner side of the plate. On its inner face the disc or plate F carries a hollow tubular shifting collar 17 which is of the proper diameter to telescopically receive and rotate upon the outwardly extending end 11 of the bushing 10. The handle carrying winding plate F is secured in driving connection to the shaft D by a screw 19 which threadedly engages the shaft through the outer end thereof.

The winding or pick-up plate E is provided with a pair of oppositely disposed notches 20 in the edge of the plate flange 13 and it will be obvious from the description thus far given that rotation of the handle carrying plate F through the medium of the handle 14 will rotate the shaft D and the winding or pick-up plate E carried thereby.

A mounting bracket G comprises a pair of spaced fingers 21 and 22 which are suitably secured to the outer face of the rear wall 5 of the spool by screws 23 or the like. These fingers extend downwardly beyond the bottom of the reel and have their lower ends secured together by an integral and elongated fishing rod engaging rest H which is of an arcuate shape in cross sectional configuration and rests upon the fishing rod and is secured thereto in any usual and conventional manner as appears in Fig. 1 of the drawings.

Intermediate their lengths the fingers 21 and 22 are provided with oppositely disposed ears 24 and 25 between which on a pin 26 is pivotally mounted a shifting lever 27 the upper end of which is provided with a head 28 disposed between the inner face of the winding handle carrying plate F and the flange 29 of the shifting collar 17. Below its pivotal support the shifting lever has an outwardly and downwardly extending end 30 upon which is pivotally supported as at 31 a flat thumb plate 32 having at its rear a notched arm forming a latch 33 which is adapted to engage and lock with a downwardly extending tongue 34 formed as a part of the mounting bracket G.

A flat spring K has one end secured as at 35 to the rear spool wall 5 while its opposite and free end 36 is behind the lower outwardly and downwardly extending end 30 of the shifting lever 27. This spring has a tension to normally hold the reel parts in the positions illustrated in Fig. 4 of the drawings, that is to say, the casting position wherein the fishing line can feed freely from the spool.

The line spool and the rewinding or pick-up plate are enclosed within a housing L the diameter of which is substantially that of the rear side wall or plate 5 of the reel. This housing has a front wall 37 and a side wall 38 the inner end of which snugly telescopically receives the top peripheral edge of the wall or plate 5 of the spool. A spring finger 39 carried by the mounting bracket engages the side wall 38 of the housing and together with the snug fit of the housing with the edge of the wall 5 prevents accidental displacement of the housing. A series of abutments 40 carried by the spool plate 5 limit the inward movement of the housing.

The housing front wall 37 is provided with a line guide opening 41 which is in axial alignment with the axis of the line spool C. The fishing line 2 leaves the inner-most pole guide eye and passes through the housing guide 41 over the pick-up or winding plate E and onto the spool in the manner illustrated in Fig. 3 of the drawings when the reel parts are in casting position or through one of the notches 20 of the pick-up plate E and onto the spool when the reel parts are in a rewinding position, as will be hereinafter more specifically described when the manner of operation of the reel is set forth.

From the foregoing description the operation of the reel can be readily understood. Casting: When this operation is to be performed the parts are in the positions illustrated in Fig. 3 where it will be seen that the thumb plate has been actuated to release the catch 33 and the pick-up plate E has moved to the left under the force exerted by the spring K. The line is free for delivery from the spool and will freely deliver therefrom and outwardly through the guide 41 when the fishing pole has been actuated or whipped in the usual manner for casting. The notch 20 of the pick-up plate is so positioned in respect to the inner wall 4 of the spool as to prevent any possibility of the line engaging the pick-up plate and furthermore as the line uncoils a centrifugal force is generated in the line which throws it outwardly away from both the pick-up plate and the spool wall 4. The side wall 38 of the housing L limits the outward movement of the line under this centrifugal force thereby preventing the line from spinning further out from the spool and thus limits the centrifugal force to be overcome as the line is brought back to the axis of the reel to pass outwardly through the line guide 41. Braking: During casting the operator's thumb is kept upon the thumb plate 32 in the manner illustrated in Fig. 6 so as to maintain the thumb plate in a vertical position. When it is desired to exert a braking action upon the line the thumb plate is moved to the left which pulls the pick-up plate inwardly until the plate reaches the position illustrated in Fig. 6 of the drawings. This movement of the pick-up plate will cause the line to be caught or engaged by one of the notches 20 of the pick-up plate with the result that the line can unwind or uncoil only by causing rotation of the pick-up plate. This in itself exerts a drag upon the line but actual braking is accomplished by a continued pressure upon the thumb plate which causes the inner face of the front wall 12 of the pick-up plate to frictionally engage the inner ends of the spool hub 9 and the bushing 10. It will be obvious that the degree of braking action can be controlled to a nicety by varying the pressure exerted upon the thumb plate. Re-reeling: To pick-up or re-reel the line the parts are positioned as illustrated in Fig. 5 of the drawings. The thumb plate has been manipulated to cause the catch 33 to lock with the tongue 34 of the mounting bracket G. This has pulled the pick-up plate E inwardly but not far enough inwardly to engage the ends of the spool hub and its bushing. This inward movement of the pick-up plate has caused automatic engagement between the line and one of the notches 20 of the pick-up plate because in its passage from the spool the line 2 now passes over the peripheral edge of the side wall 13 of the pick-up plate. The pick-up plate is rotated by the reel handle 14 and as the plate rotates the line engaging notch of the plate with the line therein is rotated about the spool and causes the line to be laid on the spool. As winding proceeds level winding is caused by the line, as it builds up on the spool, squeezing out the line underneath to fill the spool. As each coil is squeezed in it is longer in circumference than the diameter it occupies and it has been found that it distributes itself in a more or less zig-zag pattern on the reel and this leaves it free to come off, that is uncoil, when casting.

When not in use the reel would be set in the pick-up or re-reeling position and the drag or friction exerted upon the line is sufficient to prevent the line from being pulled from the spool under the force exerted by the weight of the fly or bait by reason of the fact that the line can feed outward only by causing rotation of the pick-up plate and the parts associated therewith for rotative movement.

From the foregoing it will be seen that engagement and disengagement of the pick-up plate with the line is automatic through reciprocation of the pick-up plate. With the parts in the casting position the outward movement of the pick-up plate will cause the notches 20 thereof to pass over the inner side 4 of the spool and the line 2 is automatically disengaged from that particular notch in which it has been resting. Upon movement of the pick-up plate inwardly the notches 20 of the plate are moved to a position inside the wall 4 of the spool and above the bottom thereof which brings the notches in the path of travel of the line from the spool and automatically causes the line to be engaged by one of the pick-up notches.

Should it be desired the rim of the handle plate F can be used as a brake when playing a fish. Long and accurate casts even with light lures can be made with the present reel and the improvements and advantages of the reel will be clearly understood from those skilled in the art of fishing.

As an example of a possible departure from the specific construction illustrated and described the re-reeling element could be fixed against reciprocable movement and the spool reciprocated in respect to the re-reeling element and the line pick-up thereof. Additionally it is not essential that the spool be fixed against axial rotation as the line would feed from the spool, during casting, without rotating the spool even though the spool were rotatably mounted. In the playing of a fish it might be desirable to have the spool rotatable.

Departures from the specific construction illustrated in the drawings can be made without departing from the inventive concept and the invention is to be limited only within the scope of the following claims.

I claim:

1. In combination, a fishing rod, a fishing line carrying spool supported on said rod with the axis of the spool at right angles to the axis of the rod and fixed against rotation and from which the line is freely deliverable over an end of the spool, a reciprocably rotatably mounted re-reeling element positioned at the discharge end of the spool and provided with a line pick-up means which is an immovable portion of the element, means normally positioning the re-reeling element remote to the spool and the pick-up means out of engagement with the line, means operable to move the re-reeling element toward the spool and line to engage the pick-up means thereof with the line and position the pick-up means above the spool, and means to rotate the pick-up means.

2. A construction as defined in claim 1 wherein, means is provided for locking the re-reeling element in the position where the pick-up means thereof is in engagement with the line.

3. In combination, a fishing rod and a fishing line carrying spool non-rotatably supported on the rod with the axis of the spool at right angles to the axis of the rod, the line being freely deliverable from the spool over an end thereof, a guide for the line acting to cause the line as it extends from the reel to extend in a line substantially parallel to the axis of the spool, a line re-reeling element rotatable about and reciprocal upon the axis of the spool and disposed at one side of that portion of the line which extends between the spool and the guide, means to reciprocate the re-reeling element to move it toward and away from the spool, the re-reeling element being provided with a line engaging pick-up which is immovable in respect to the element, said line passing freely over said re-reeling element and the pick-up thereof when said element is in its remote position in respect to the spool, and the pick-up engaging the line and being positioned immediately above the spool when the element is in its retracted position in respect to the spool, whereby rotation of the re-reeling element winds the fish line about the spool.

4. In combination, a fishing rod and a fishing line carrying spool non-rotatably supported on the rod with the axis of the spool at right angles to the axis of the rod, the line being freely deliverable from the spool over an end thereof, a line guide causing the line to extend outwardly from the spool in a line substantially parallel to the axis of the spool, a line pick-up normally positioned at the discharge end of the spool and disposed at one side of the outwardly extending line, the pick-up being mounted to revolve about the axis of the spool and being movable toward and away from the spool, the outwardly extending line at the discharge end of the spool being bent at substantially right angles, the pick-up upon movement towards the spool passing over the discharge end thereof and embodying means to engage the line at the point of passage of the line over the discharge end of the spool and to push the line engaged portion of the line over the bottom of the spool, means to rotate the pick-up, and the pick-up further embodying a portion engaging a side of the line and acting to feed the line about the spool as the pick-up is rotated.

5. A construction as defined in claim 4 wherein, resilient means is provided to normally position the pick-up at the discharge end of the spool, and means is provided for locking the pick-up in its retracted re-reeling position above the spool bottom.

6. In combination, a fishing rod and a fishing line carrying spool non-rotatably supported on the rod with the axis of the spool at right angles to the axis of the rod, the line being freely deliverable from the spool over an end thereof, a line guide causing the line to extend outwardly from the spool in a line substantially parallel to the axis of the spool, a line pick-up normally positioned at the discharge end of the spool and disposed at one side of the outwardly extending line, the pick-up being mounted to revolve about the axis of the spool and being movable toward and away from the spool, the pick-up comprising an element having a line reception opening, means to move the pick-up towards the spool to cause the opening thereof to engage the line and to position the opening above the bottom of the spool, and means to rotate the pick-up.

7. A construction as defined in claim 6 wherein, resilient means is provided to normally position the pick-up at the discharge end of the spool, and means is provided for locking the pick-up in its retracted re-reeling position above the spool bottom.

8. In combination, a fishing rod and a fishing line carrying spool non-rotatably supported on the rod with the axis of the spool at right angles to the axis of the rod, the line being freely deliverable from the spool over an end thereof, a line guide causing the line to extend outwardly from the spool in a line substantially parallel to the axis of the spool, a line pick-up normally positioned at the discharge end of the spool and disposed at one side of the outwardly extending line, the pick-up being mounted to revolve about the axis of the spool and being movable toward and away from the spool, the pick-up comprising an element having a peripheral leading edge movable over the discharge end of the spool to a position above the spool bottom, and the leading edge of the pick-up element provided with means adapted to engage the line and push the same over the spool bottom and wind the line about the spool as the pick-up is moved to a position over the spool bottom and rotated about the spool.

9. A construction as defined in claim 8 wherein, resilient means is provided to normally position the pick-up at the discharge end of the spool, and means is provided for locking the pick-up in its retracted re-reeling position above the spool bottom.

10. A construction as defined in claim 8 wherein, a brake is provided for frictionally retarding the rotation of the line pick-up, and said brake being brought into braking operation as the pick-up approaches and is moved to its finally retracted position in respect to the spool.

11. A construction as defined in claim 6 wherein, a detachable cover is provided for the spool and is provided with a side adjacent the discharge end of the spool, the line guide comprising an opening in said cover side, and said opening being in substantial axial alignment with the axis of the spool.

12. In combination, a fishing rod and a fishing line carrying spool non-rotatably supported on the rod with the axis of the spool at right angles to the axis of the rod, the line being freely deliverable from the spool over an end thereof, a line guide causing the line to extend outwardly from the spool in a line substantially parallel to the axis of the spool, a line pick-up normally positioned at the discharge end of the spool and disposed at one side of the outwardly extending line, the pick-up being mounted to revolve about the axis of the spool and being movable toward and away from the spool, the pick-up comprising a pan-like element which upon movement of the pick-up toward the spool telescopically receives the spool, the leading peripheral edge of said element provided with an opening adapted to engage the line, the discharge end of the spool closing said opening against the entry of the line when the pick-up element is in its normal position at the discharge end of the spool, and said opening being disposed above the spool bottom and open for the reception of the line when the pick-up element is moved toward and to its final inward position in respect to the spool.

13. In combination, a fishing rod and a fishing line carrying spool non-rotatably supported on the rod with the axis of the spool at right angles to the axis of the rod, the line being freely deliverable from the spool over an end thereof, a line re-reeling element including as a non-movable part thereof a line engaging pick-up adapted to receive and engage the line, said re-reeling element being mounted to revolve about the axis of the spool and being positioned at the discharge end of the spool and being movable toward and away from the spool, means when the re-reeling element is in its remote position to the spool preventing reception of the line by the pick-up, said pick-up being free to receive and engage the line and engaging the line when the re-reeling element is moved into a retracted position in respect to the spool, and means to rotate the re-reeling element.

14. In combination, a fishing rod and a fishing line carrying spool supported on the rod with the axis of the spool at right angles to the axis of the rod, the line being freely deliverable from the spool over an end thereof without spool rotation, an element including as a non-movable part thereof a line engaging pick-up adapted to receive and engage the line, the parts comprising the spool and the element being positionable in side by side spaced relationship, means normally holding said parts in said spaced positions, the line pick-up being out of engagement with the line when the parts are in said positions, means to move said parts into telescopic relationship to cause the pick-up to engage the line and position the line above the spool, and means to rotate one of said parts in respect to the other to wind the line about the spool.

15. In combination, a fishing rod and a fishing line carrying spool supported on the rod with the axis of the spool at right angles to the axis of the rod and fixed against rotation and from which the line is freely deliverable over an end of the spool, an element including as a non-movable part thereof a line engaging pick-up adapted to receive and engage the line, the parts comprising the spool and the element being positionable in side by side spaced relationship, means normally holding said parts in said spaced positions, the line pick-up being out of engagement with the line when the parts are in said positions, means to move said parts into telescopic relationship to cause the pick-up to engage the line and position the line above the spool, the element including the line engaging pick-up being rotatable, and means to rotate said element.

IRA B. HUMPHREYS.

REFERENCES CITED

The following references are of record in the file of this patent:

UNITED STATES PATENTS

| Number | Name | Date |
|---|---|---|
| 2,034,917 | Miller | Mar. 24, 1936 |

FOREIGN PATENTS

| Number | Country | Date |
|---|---|---|
| 22,597 | Great Britain | June 11, 1908 |
| 380,254 | Great Britain | Sept. 15, 1932 |
| 380,939 | Great Britain | Sept. 29, 1932 |
| 909,825 | France | Jan. 7, 1946 |